United States Patent

Takagi

[11] Patent Number: 5,819,223
[45] Date of Patent: Oct. 6, 1998

[54] SPEECH ADAPTATION DEVICE SUITABLE FOR SPEECH RECOGNITION DEVICE AND WORD SPOTTING DEVICE

[75] Inventor: Keizaburo Takagi, Tokyo, Japan

[73] Assignee: NEC Corporation, Tokyo, Japan

[21] Appl. No.: 592,174

[22] Filed: Jan. 26, 1996

[30] Foreign Application Priority Data

Jan. 26, 1995 [JP] Japan ................................. 7-011042

[51] Int. Cl.⁶ ........................................................ G01L 5/06
[52] U.S. Cl. ........................ 704/256; 704/252; 704/243
[58] Field of Search ..................... 395/2.65, 2.6, 395/2.61, 2.63, 2.64, 2.45, 2.52–2.54; 382/181, 184, 190, 209, 215, 224, 225, 228

[56] References Cited

U.S. PATENT DOCUMENTS

| 4,924,518 | 5/1990 | Ukita ..................................... 395/2.58 |
| 5,199,077 | 3/1993 | Wilcox et al. ......................... 395/2.52 |
| 5,315,689 | 5/1994 | Kanazawa et al. ..................... 395/2.6 |
| 5,390,278 | 2/1995 | Gupta et al. ........................... 395/2.64 |
| 5,425,129 | 6/1995 | Garman et al. ........................ 395/2.65 |
| 5,617,486 | 4/1997 | Chow et al. ........................... 395/2.65 |

FOREIGN PATENT DOCUMENTS

| 0 312 209 | 4/1989 | European Pat. Off. . |
| 0 342 630 | 11/1989 | European Pat. Off. . |
| 0 388 067 | 9/1990 | European Pat. Off. . |
| WO 95/09416 | 4/1995 | WIPO . |

OTHER PUBLICATIONS

Rosenberg et al., "Cepstral Channel Normalization Techniques for HMM–Based Speaker Verification", Proceedings of ICSLP94, S31.1, (1994) p. 1835–1838.

*Primary Examiner*—Kee M. Tung
*Attorney, Agent, or Firm*—Foley & Lardner

[57] ABSTRACT

A speech adaptation device comprises a vocabulary independent reference pattern memory for memorizing a plurality of vocabulary independent reference patterns having one or more categories. Each category has one or more acoustic units, and has such a connection relation of the acoustic units that allows reception of any sequence of the acoustic units appearing in the input speech. A preliminary matching unit is for use in making time-alignment between the time series of the feature vectors of the input speech obtained from the analysis unit and the vocabulary independent reference pattern to obtain mean vectors for individual categories of the input speech and the vocabulary independent reference pattern from the aligned portion for the individual categories of the feature vectors of the input speech and the vocabulary independent reference pattern. An adaptation unit is for use in making correction of at least one of the time series of the feature vectors of the input speech and the vocabulary independent reference pattern by using the mean vectors for each category calculated by the preliminary matching unit.

9 Claims, 5 Drawing Sheets

VOCABULARY INDEPENDENT
REFERENCE PATTERN

VOCABULARY INDEPENDENT
REFERENCE PATTERN

SPEECH ADAPTATION DEVICE SUITABLE FOR SPEECH RECOGNITION DEVICE AND WORD SPOTTING DEVICE

BACKGROUND OF THE INVENTION

The present invention relates to a speech adaptation device which is suitable for a speech recognition device and a word spotting device and, more particularly, to technique for use in adjusting a difference between an input speech and a reference pattern to improve performance.

A speech recognition rate in recognizing a speech is known to fall due to differences in tone between an input speech and a reference pattern. Of these differences in tone, a major factor that particularly causes the reduction of the speech recognition rate can generally be classified into two factors. One of the two factors is an environmental factor due to an environment where a speaker makes the speech. Another one of the two factors is due to the speaker's speech itself. In addition, the environmental factor can further be classified into two factors: an additional noise such as a background noise which is incorporated along with the speech of the speaker and acts in an additive manner on spectrum, and a channel distortion such as transmission characteristics of a microphone or a telephone line which distort the spectrum itself and act in a multiplicative manner on the spectrum.

Conventionally, there are various adaptation techniques to cope with these factors. For example, there are adaptation techniques directed to cope with the two factors, the additional noise due to the environment and the channel distortion, and thereby to avoid reduction of the speech recognition rate due to the environment. For example, a speech adaptation device suitable for a speech recognition device is disclosed in a paper contributed by Takagi, Hattori, and Watanabe, to Proceedings of the Spring Meeting of the Acoustic Society, 2-P-8, pages 173–174 (1994. 3), under the title of "Speech Recognition with Environment Adaptation by Spectrum Equalization" (hereinafter, referred to as a first cited article (I)).

The speech adaptation device comprises an analysis unit, a reference pattern memory, and a preliminary matching unit. An input speech subjected to deformation by the additional noise and the transmission distortion is converted into a time series of feature vectors in the analysis unit. The reference pattern memory preliminarily memorizes a plurality of word reference patterns which are previously analyzed by the use of training speeches in a similar manner to the analysis unit and which hold time series information for each word to be recognized. Each word reference pattern is previously provided with a label indicative of the distinction between a speech interval and a noise interval. The preliminary matching unit carries out matching between the time series of the feature vectors of the input speech and the time series of each word reference pattern, chooses a first word reference pattern, and obtains a time-alignment between the input speech and the first word reference pattern in relation to a time axis. A mean vector calculation unit carries out an adaptation operation of the reference pattern in the manner which will later be described in detail.

Such an adaptation operation eliminates the difference in environment between the reference pattern and the input speech, so that it is possible to provide the speech adaptation device having a stable and high performance even when the environment is varied.

However, the conventional speech adaptation device has a problem that the input speech should be one of the words which are prepared previously because the reference pattern memory memorizes the word reference patterns. In other words, there is a problem that the performance after the adaptation is deteriorated significantly in the case where a word other than those prepared previously in received as the input speech.

In addition, there is a problem that application of the speech adaptation device to a continuous speech recognition device, if tried, cannot so readily be achieved. This is because the input speech is a continuous speech and thus the reference pattern is required to have a structure capable of receiving continuous speeches using the word reference patterns, which significantly increases a calculation amount and a memory capacity for the preliminary matching using it. Furthermore, a natural utterance such as the continuous speech often includes non-predictable speeches such as faltering, repetition, and unnecessary words. The conventional speech adaptation device in which vocabulary is determined previously has a problem that the performance of the adaptation is deteriorated significantly if a speech other than the previously defined vocabulary is received, which in turn deteriorates the recognition performance for the continuous speech.

Moreover, there is a problem that, when the speech adaptation device is incorporated into word spotting, it is almost impossible to predict the input speech previously with respect to the vocabulary and thus no word reference patterns for the adaptation can be prepared previously.

SUMMARY OF THE INVENTION

It is therefore an object of the present invention to overcome the above mentioned problems and to provide a speech adaptation device capable of achieving adaptation with high accuracy even when a given utterance of an input speech upon recognition is unknown.

It is another object of this invention to provide the speech adaptation device which is suitable for a word speech recognition device.

It is further object of this invention to provide the speech adaptation device which is suitable for a continuous speech recognition device.

It is still further object of this invention to provide the speech adaptation device which is suitable for a word spotting device.

Other objects of the present invention will become clear as the description proceeds.

A speech adaptation device according to the present invention comprises an analysis unit for use in converting an input speech into a time series of feature vectors, a vocabulary independent reference pattern memory for memorizing a plurality of vocabulary independent reference patterns having one or more categories. Each category has one or more acoustic units and has such a connection relation of the acoustic units that allows reception of any sequence of the acoustic units appearing in the input speech. The first speech adaptation device further comprises a preliminary matching unit connected to the analysis unit and the vocabulary independent reference pattern memory for use in making time-alignment between the time series of the feature vectors of the input speech obtained from the analysis unit and the vocabulary independent reference pattern to obtain mean vectors for individual categories of the input speech and the vocabulary independent reference pattern from the aligned portion for the individual categories of the feature vectors of the input speech and the vocabulary independent reference pattern, and an adaptation unit for use in making correction of at least one of the time series of the feature vectors of the input speech and the vocabulary independent reference pattern by using the mean vectors for each category calculated by the preliminary matching unit.

DESCRIPTION OF THE PREFERRED EMBODIMENTS

Figure 1:
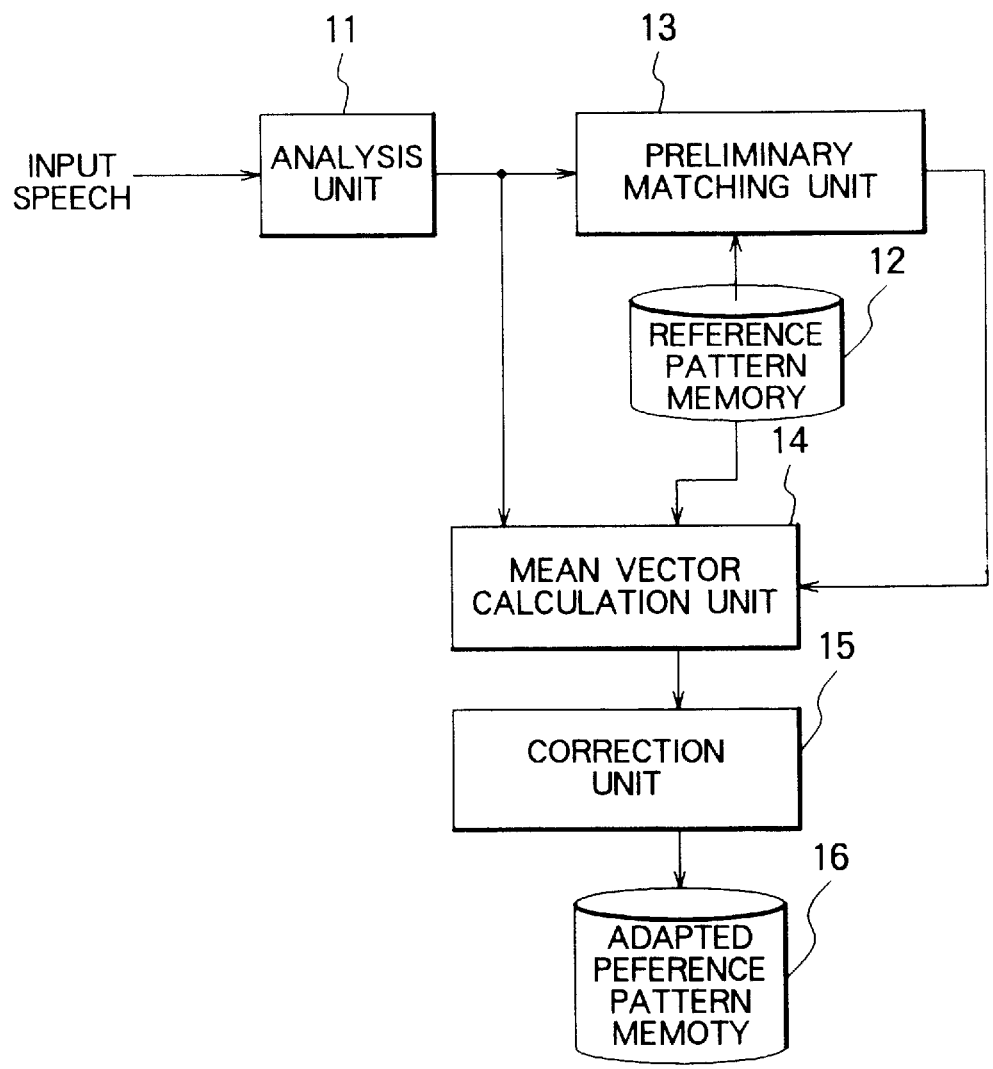
FIG. 1 is a block diagram showing a conventional speech adaptation device.

Referring to FIG. 1, a conventional speech adaptation device will be described at first in order to facilitate an understanding of the present invention. The speech adaptation device is of the type that cited hereinbefore as the first cited article (I).

An input speech subjected to deformation by an additional noise and a transmission distortion is converted into a time series of feature vectors in an analysis unit 11. A reference pattern memory 12 preliminarily memorizes a plurality of word reference patterns. The word reference patterns can be obtained by using training speeches in a manner carried out in the analysis unit 11 and hold time series information for each word to be recognized. Each word reference pattern is previously provided with a label indicative of the distinction between a speech interval and a noise interval. A preliminary matching unit 13 carries out matching between the time series of feature vectors of the input speech and the time series of each word reference pattern, chooses a best matched word reference pattern as a first word reference pattern, and obtains a time-alignment between the input speech and the first word reference pattern in relation to a time axis.

A mean vector calculation unit 14 calculates mean vectors of each of the noise intervals and the speech intervals on the basis of the time-alignment between the first word reference pattern obtained by the preliminary matching unit 13 and the feature vectors of the input speech. In this event, let the mean vectors of the speech intervals and the noise intervals in the input speech be Sv and Nv, respectively, and the mean vectors of the speech intervals and the noise intervals in the first word reference pattern be Sw and Nw, respectively. A correction unit 15 carries out an adaptation operation of the first word reference pattern by using the four mean vectors calculated in the mean vector calculation unit 14 in accordance with a first equation (1) given by;

$$\tilde{W}(t)=[Sv-Nv][W(t)-Nw]/[Sw-Nw]+Nv. \qquad (1)$$

In the first equation (1), W(t) represents a word reference pattern before the adaptation, t represents an index of all word reference patterns, and $\tilde{W}(t)$ represents an adapted word reference pattern after the adaptation.

The above-mentioned adaptation operation is carried out each time when the analysis unit 11 receives the input speech. The adapted reference pattern is memorized in an adapted reference pattern memory 16.

Such an adaptation operation eliminates the difference in environment between the word reference pattern and the input speech, so that it is possible to provide a speech adaptation device having a stable and high performance even when the environment is changed.

However, the speech adaptation device has a problem that the input speech should be one of the words which are prepared previously because the reference pattern memory 12 memorizes the word reference patterns. In other words, there is a problem that the performance after the adaptation is deteriorated significantly in the case where a word other than those prepared previously is received as the input speech.

Although a speech adaptation device according to this invention has various variations, basic operation thereof will be described at first referring to FIGS. 2 and 3. The present invention is for providing the speech adaptation device which is capable of carrying out adaptation with high accuracy by using a plurality of vocabulary independent reference patterns, even for the input speech of which content cannot be known previously.

Although description is made herein by giving the one indicated in the first cited article (I) as an example of an adaptation unit 24, other adaptation techniques such as speaker adaptation may be applied similarly. An input speech including a noise is converted into a time series of feature vectors in an analysis unit 21. For those typically and often used as feature vectors, various ones are known that are disclosed in, for example, a book entitled "Digital Speech Processing", published by Tokai University Publishing. pages 154–160 (1985) (hereinafter, referred to as a second cited article (II)). However, described herein is a case where spectrum is used that is obtained by an LPC analysis or an FFT analysis, and no description is made on how to extract it. The time series of given spectrum is represented by X(t) (where t is a discrete time instant). Note that it is obvious that the spectrum and cepstrum in reversible with each other if the cepstrum is used as the feature vectors, so that description is made only for the case where the spectrum is used.

The input speech is typically difficult to be extracted positively with a beginning and an end of the speech and there is a possibility of a consonant at the beginning being lost, so that the speech slightly longer than the extracted beginning and end is typically analyzed to avoid loss of the speech.

A vocabulary independent reference pattern memory 22 preliminarily memorizes a plurality of vocabulary independent reference patterns. The vocabulary independent reference patterns can be obtained from reference speaker speeches analyzed previously in a manner similar to the analysis unit 11. For example, as illustrated in FIG. 2, the reference speaker speech is classified into two categories of an acoustic unit for a speech portion and an acoustic unit for a noise portion and are registered as two state HMM (Hidden Markov Model). In other words, though the speeches that learned the vocabulary independent reference patterns are limited in number as far as the combination of phonemes defining a vocabulary is concerned, almost all appear when considered for each phoneme (such as a syllable) as such, after the training with a certain enough amount of speeches.

Accordingly, it is possible to compose a reference pattern capable of receiving all speeches of a subjected language when the acoustic unit of the reference pattern is composed with the smaller (e.g., syllable) unit rather than using a large unit such as a word and is connected to allow reception of transition of them all.

A preliminary matching unit 23 makes time-alignment between the time series X(t) of the feature vectors of the input speech and the vocabulary independent reference patterns, determines whether the input speech belongs to the speech or the noise of the vocabulary independent reference patterns, and produces at the same time mean vectors of the input speech and the vocabulary independent reference patterns, respectively, for the speech portion and the noise portion. Let the mean vectors of the speech and the noise of the input speech be Sv and Nv, respectively, and the mean vectors of the speech and the noise of the vocabulary independent reference patterns be Sw and Nw, respectively. The adaptation unit 24 carries out an adaptation operation by using these four mean vectors in accordance with the first equation (1) mentioned hereinbefore.

While the description has been made in conjunction with a system in which the reference pattern is adapted into the input speech, the reverse may of course be made with the input speech adapted into the reference pattern or both adapted into each other.

In other words, according to the present invention, there is an effect in that such a speech adaptation device can be provided that is not affected by the given utterance of the input speech. This is because the adaptation can be made even if the speech to be adapted is unknown with respect to the vocabulary.

Figure 2:
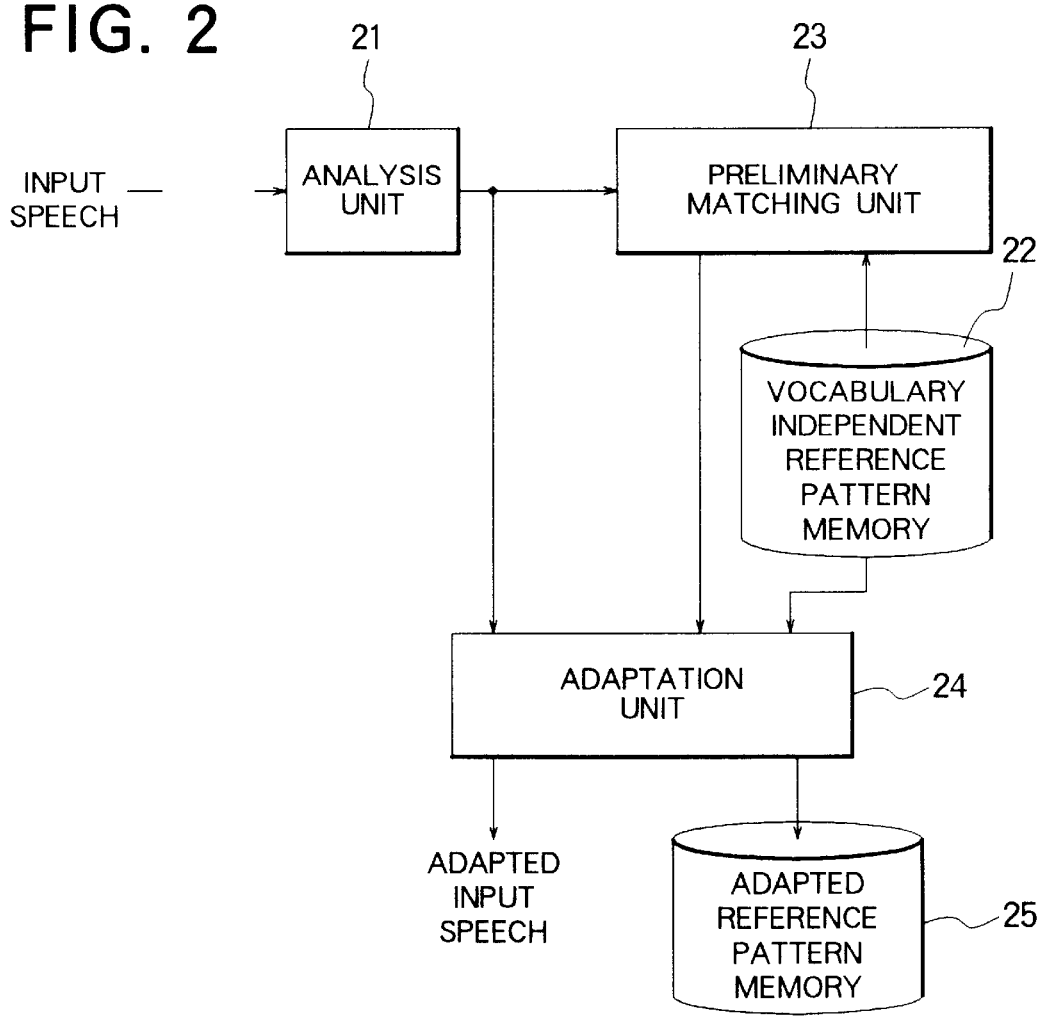
FIG. 2 in a block diagram showing a speech adaptation device according to the present invention.

Referring to FIG. 2, a first speech adaptation device according to the present invention will be described. The first speech adaptation device comprises the analysis unit 21 for use in converting the input speech into a time series of feature vectors. The vocabulary independent reference pattern memory 22 preliminarily memorizes a plurality of vocabulary independent reference patterns which have one or more categories, each category having one or more acoustic units, and having such a connection relation of the acoustic units that allows reception of any sequence of the acoustic units appeared in the input speech. The preliminary matching unit 23 is for use in making time-alignment between the time series of the feature vectors of the input speech obtained from the analysis unit 21 and the vocabulary independent reference patterns to obtain mean vectors for individual categories of the input speech and the vocabulary independent reference patterns from the aligned portion for the individual categories of the feature vectors of the input speech and the vocabulary independent reference patterns. The adaptation unit 24 is for use in making correction of at least one of the time series of the feature vectors of the input speech and the vocabulary independent reference patterns by using the mean vectors for each category calculated by the preliminary matching unit 23.

The input speech including the noise is converted into the time series of the feature vectors for preliminary matching in the analysis unit 21. Those typically and often used as the feature vectors are considered to be, for example, power information, a change amount of power information, the cepstrum, or a linear regression coefficient of the cepstrum, and a combination thereof may be used as the feature vectors. Alternatively, it is possible to use spectrum as such or to use logarithmicated spectrum. The input speech typically has a portion existing therein where no speech is present before and after the utterance and only ambient noise is contained. The vocabulary independent reference patterns are made independent concerning vocabulary by means of providing such a connection relation of the acoustic units that allows reception of any acoustic units appearing in the input speech.

A method of forming these reference patterns may be the one using HMM (Hidden Markov Model) as described in, for example, pages 162–170 of the second cited article (II), or may be a code book subjected to the vector quantization or the feature vectors of the speech. In order to permit reception of any vocabularies, it is achieved by means of, for example, composing to have all connection relations among the acoustic units that are the partial extraction of training speeches or trained results. For example, as one method of achieving it, for a case subjected to Japanese, it is achieved by means of allowing all transitions among the acoustic units corresponding to individual syllables such as /a/, /i/, /u/, . . . /n/ and connecting such that any and all time series of the syllables can be accepted. For the acoustic unit, various ones can be considered but it is preferable to use ones having an equal or smaller length than a word. In addition, it is possible to compose to prohibit any joint of a sequence (e.g., /nn/) of a syllable that does not appear in Japanese.

The preliminary matching unit 23 makes time-alignment between the vocabulary independent reference patterns generated in this way and the time series of the feature vectors of the input speech. This time-alignment may be methods such as the DP matching or HMM as timing normalized matching. Furthermore, the timing normalized matching may not necessarily be used when each acoustic unit of the vocabulary independent reference patterns have no non-linear extension and reduction function along the time axis (the acoustic unit always corresponds to a frame of a fixed length), and it can be realized only by means of the processing of selecting the acoustic unit the likelihood thereof is the maximum. Based on the time-alignment information so obtained, a mean value for each category is obtained for both the input and reference patterns.

The adaptation unit 24 carries out adaptation of at least one of the input speech and the vocabulary independent reference patterns by using the mean values for each category obtained in the preliminary matching unit 23, and produces results thereof as an adapted input speech and an adapted reference pattern. The adapted reference pattern is memorized in an adapted reference pattern memory 25.

Figure 3:
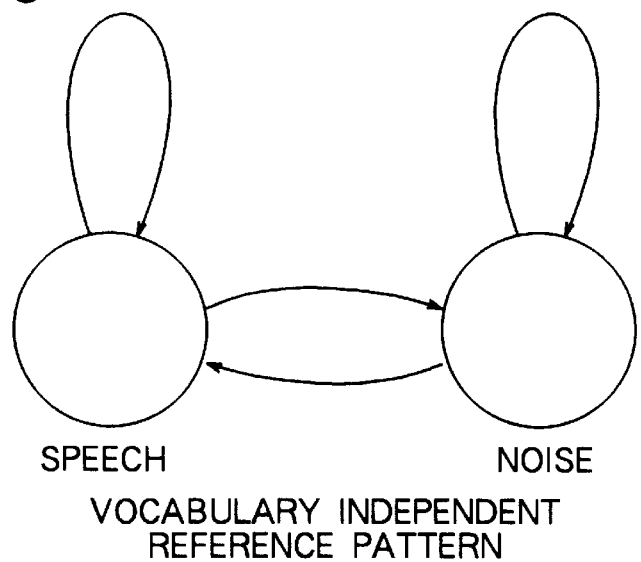
FIG. 3 is an illustration for describing an example of a vocabulary independent reference pattern which is applied to the speech adaptation device illustrated in FIG. 2.

FIG. 3 is a view illustrating an example of the vocabulary independent reference patterns applied to a second speech adaptation device according to the present invention. The second speech adaptation device is characterized by the vocabulary independent reference patterns and the adaptation unit 24. Namely, the category of the vocabulary independent reference patterns comprises one or more noise categories and one or more speech categories (in which the speech and the noise are represented by S and N, respectively). The adaptation unit 24 replaces a noise portion of either one of the time series of the feature vectors of the input speech or the vocabulary independent reference patterns with a mean vector Ni of the noise portion of the other, subtracts a mean vector Nt of the noise portion of either one from a speech portion of the same, then multiplies it (Si−Ni)/(St−Nt), (wherein the slash / indicates division for each channel of the vectors, Si indicates a mean vector of the speech portion of the other, and St indicates a mean vector of the speech portion of the same), and further adds Ni thereto.

In the vocabulary independent reference patterns, the acoustic unit trained from a training speech are divided into a speech portion and a noise portion to make time-alignment to two categories of speech and noise. Transition from and to two categories as well as within categories can be made optionally. There may be a number of acoustic units in the speech and the noise. To make the time-alignment carried out in the preliminary matching unit 23 selects the acoustic unit having the maximum likelihood at each time instant and multiplies the mean value for each category depending an whether it is the speech category or the noise. With this structure, reception can be made for any uttered contents appearing in the language used.

The adaptation unit 24 carries out the adaptation as, for example, those indicated in the first cited article (I). Let the mean vectors of the speech interval and the noise interval of the input speech be Sv and Nv, respectively, and the mean vectors of the speech interval and the noise interval of the reference patterns be Sw and Kw, respectively. The adaptation unit 24 carries out the adaptation in accordance with the second equation (2) mentioned before. Of the reference patterns those belonging to the noise category are replaced with the mean vector Nv of the noise in the input speech. In this example, the adaptation for the reference patterns has been described. However similar processing may be made for the input speech. This adaptation technique is adaptation on the spectrum but it may be realized easily by means of providing a conversion unit between the cepstrum and the spectrum when the feature vectors are the cepstrum. In such an event, the mean vector may be obtained on the cepstrum or may be obtained after once being converted into the spectrum.

The description will proceed to a third speech adaptation device according to the present invention. The third speech adaptation device is characterized by the adaptation unit 24. Namely, the adaptation unit 24 carries out correction for at least one of the time series of the feature vectors of the input speech and the vocabulary independent reference patterns by using a difference between the average vectors of each category.

As the adaptation unit 24, any one may be feasible if it is an adaptation technique utilizing the mean value for each category. For example, the technique like speaker adaptation may be used. For example, following holds when the speaker adaptation is used that is disclosed in a paper contributed by Shinoda, Iso, and Watanabe to Proceedings of the Electronic, Information and Communication Society, A. Vol. J77-A, No. 2, pages 120–127 (February 1994), under the title of "Speaker Adaptation using Spectral Interpolation for Speech Recognition" (hereinafter, referred to as a third cited article (III)). By the use of a mean value $\bar{\mu}j$ to a category j of the input speech and a mean value $\mu j$ to the category j of the reference pattern, an adaptation vector $\Delta j$ for that category is obtained in accordance with a second equation given by:

$$\Delta j = \bar{\mu} j - \mu j. \qquad (2)$$

In addition, for a category i of the reference pattern in which no category is present in the input speech, as described in the third cited article (III), a method called spectral interpolation which is represented by a third equation given by:

$$\Delta i = \sum_j wij \Delta j, \qquad (3)$$

may be used, where j represents the category of the reference pattern in which the acoustic category is present in the input speech. The adaptation unit 24 adapts by using these adaptation vectors to all reference patterns k belonging to the acoustic category i or j in accordance with a fourth equation given by:

$$\bar{\mu}k = \mu k + \Delta. \qquad (4)$$

In this event, $\Delta$ is used by advantageous selection from either one of $\Delta i$ or $\Delta j$ depending on the type of k. In this example, description has thus been made in conjunction with the case where the reference patterns are adapted significantly by using the adaptation vectors. It may be structured, by using, for example, an adequate coefficient $\alpha$ to control the degree of adaptation, and in accordance with a fifth equation given by:

$$\bar{\mu}k = [(1+\alpha)\mu k + \Delta]/[1+\alpha]. \qquad (5)$$

In this example, the adaptation unit 24 adapts only for the vocabulary independent reference patterns, it may of course carry out equivalent processing on the input speech.

In addition, there is a technique called cepstrum mean normalization (CMM). For example, in the speech adaptation device disclosed in a paper contributed by A. E. Rosenberg, et al, to Proceedings of ICSLP94, S31.1, pages 1835–1838 (1994), under the title of "Cepstral Channel Normalization Technique for HMM-Based Speaker Verification" (hereinafter, referred to as a fourth cited article (IV)), the number of categories is equal to 2 (speech and noise) and the feature vector uses the cepstrum to carry out the adaptation only for the speech portion of the input speech. Of course, a word reference pattern is used in the fourth cited article (IV) rather than the vocabulary independent reference pattern. This adaptation technique may be, however, used for the adaptation unit 24 of the present invention. More specifically, let the feature vector for the speech portion of the input speech (cepstrum) be yt, the mean value of the feature vectors of the speech portion thereof be $\bar{y}$, and the mean value of the speech portions of the reference pattern be $\bar{y}^{tr}$, the adaptation is carried out in accordance with a sixth equation given by:

$$yt \leftarrow yt - (\bar{y} - \bar{y}^{tr}). \qquad (6)$$

Namely, the input speech is replaced by using the difference between the mean vectors of that category.

Figure 4:
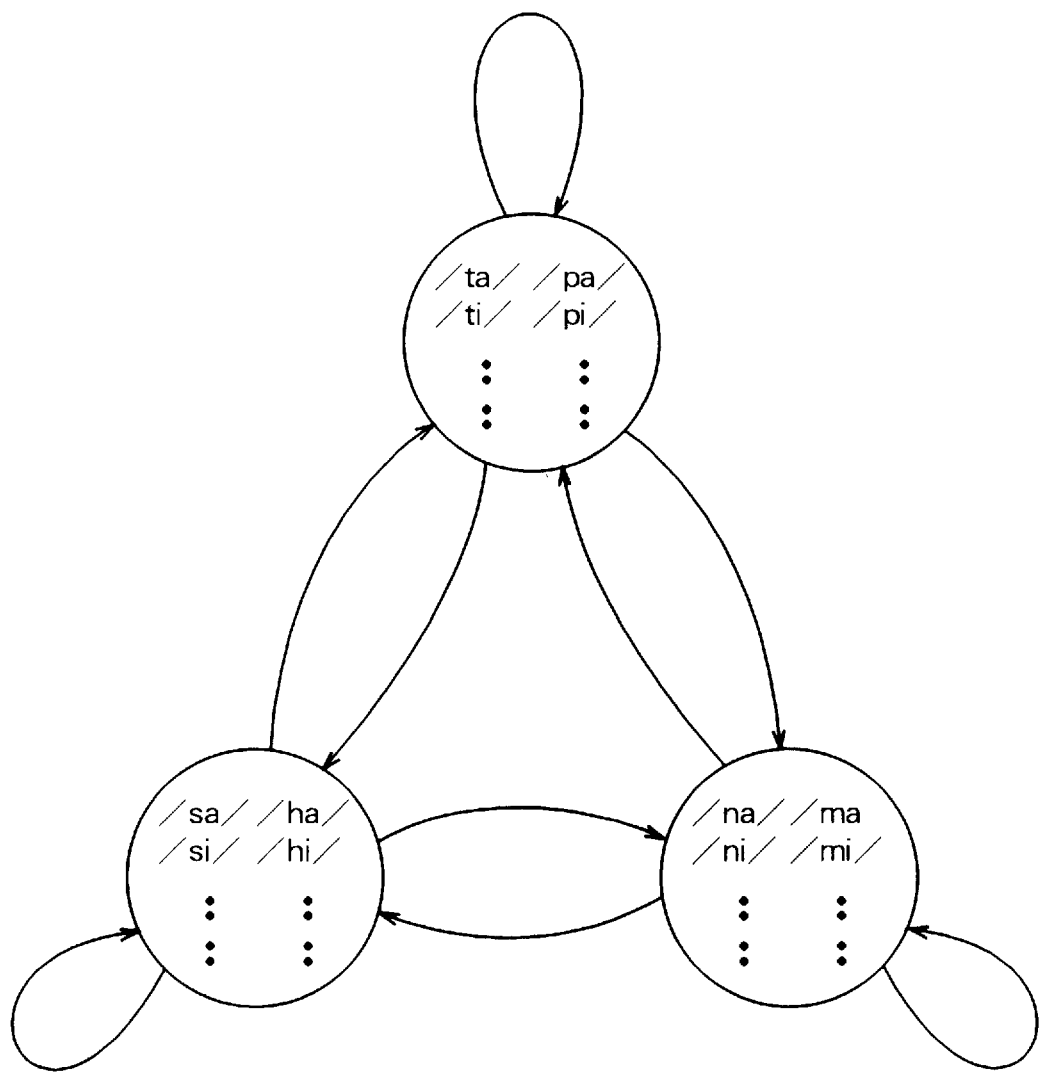
FIG. 4 is an illustration for describing an example of a vocabulary independent reference pattern which is applied to the speech adaptation device illustrated in FIG. 2.

Referring to FIG. 4, the description will proceed to an example of the vocabulary independent reference patterns applied to a fourth speech adaptation device according to the present invention. The fourth speech adaptation device uses the vocabulary independent reference patterns in which the acoustic unit of the vocabulary independent reference patterns of the first, the second, and the third speech adaptation devices mentioned before is based on a Consonant (C), a vowel (V) and a noise (N) appearing in the input speech, or based on a sequence of two or more of these (such as CV, VC, CVC, VN).

FIG. 4 shows the case where three categories for example are provided and the acoustic unit of each category is a syllable. A case for Japanese is indicated herein, a similar structure may be made with a language other than this. Transition from and to respective categories as well as within categories can be made optionally. Therefore, any and all uttered contents in the language can be received with the structure in which all syllables appearing are categorized into one of the three categories. While the case has thus been given herein where the acoustic unit is a syllable, a unit of two or more sequences of syllables may be used. In addition, anything may be used if it is a unit similar to a syllable. Advantages of using the structure of the type described are in that such a structure is allowed that avoids connection impossible in the subjected language such as /nn/ because of the linguistic information added previously to the acoustic unit, and in that the precision of the preliminary matching is improved, which in turn has a high adaptation performance. Furthermore, the results of the adaptation can be applied to word spotting or speech recognition directly by using the acoustic units commonly for a dictionary for the word spotting or the speech recognition, allowing to provide a more sophisticated device.

A fifth speech adaptation device according to the present invention is characterized in that the acoustic unit of the vocabulary independent reference patterns in the fourth speech adaptation device mentioned above is formed by using, for example, the HMM. The HMM generally has a plurality of states. In the example of the acoustic units illustrated in FIG. 4, each acoustic unit is composed of individual HMM.

More particularly, the fifth speech adaptation device is characterized in that the acoustic unit of the vocabulary independent reference pattern in the fourth speech adaptation device is formed by using, for example, a part of the time series feature vectors of the training speech. For example, in the case where the training speech is the pronunciation /toukyou/, this is segmented and separated by syllable into /to/,/u/,/kyo/,/u/. The feature vector of this separated each syllable is formed as the acoustic unit. The segmentation may be carried out through inspection, or may be carried out automatically by using HMM already trained.

In the fifth speech adaptation device, the acoustic unit of the vocabulary independent reference pattern in the fourth speech adaptation device is formed by using each centroid obtained after the vector quantization. The vector quantization is a technique which has widely been used for recognition and coding of speech, and is a technique to put together, by each neighbor, vectors within an acoustic space distributed almost unlimitedly and express them with a limited number of vectors. The vector quantization technique is disclosed in, for example, a book published by Electronics, Information, and Communication Society and Corona Co., pages 26–28 (1988), under the title of "Speech Recognition using Probability Models", and description thereof is therefore omitted here. For example, the reference pattern may be formed by a unit of syllable by means of a sequence of code books formed of a large number of vector-quantized training speeches. Each vocabulary independent reference pattern is structured by using the acoustic unit such an a syllable obtained in the manner described above.

A sixth speech adaptation device according to the present invention is characterized in that it has the vocabulary independent reference patterns in which the acoustic unit of the vocabulary independent reference patterns of the first, the second, or the third speech adaptation device mentioned above is, for example, a state of HMM.

Generally, the HMM is composed of sequences of plural states and has such a structure that allows reception or utterance of any and all contents by means of separating the sequence of this state into the acoustic unit. An advantage of the structure of the type described is that the speech adaptation device of this type can be structured readily without previous segmentation even in the case where an original reference pattern is not formed of smaller basic units such as syllables previously separated (e.g., a technique in which training is carried out for each word template).

The sixth speech adaptation device has such the vocabulary independent reference patterns that the acoustic unit of the vocabulary independent reference patterns of the first, the second, or the third speech adaptation device is, for example, each centroid obtained after the vector quantization.

Each cluster center of gravity (centroid) may be used as the acoustic unit when the original reference pattern is structured by using the vector quantization technique. The vector quantization is carried out with a large number of speeches, and the centroid of the resultant code books is used as the acoustic unit to form the vocabulary independent reference pattern, which allows reception of appearance of any and all contents. An advantage of such structure lies in the point that the acoustic unit can be realized through a simple technique because it has no non-linear extension function in the direction of the time axis along the advantages that the sixth speech adaptation device commonly has.

The sixth speech adaptation device may have such the vocabulary independent reference patterns that the acoustic unit of the vocabulary independent reference patterns of the first, the second, or the third speech adaptation device of the present invention is, for example, a distribution of HMM.

Typically, the HMM is composed of sequences of plural states and each state can be composed in so-called multi Gaussian having a number of distributions. The states of the HMM are separated individually, and this may be used to form the vocabulary independent reference patterns. With this structure, utterance of any and all contents can be received. An advantage of such structure lies in the point that the acoustic unit can be realized through a simple technique because it has no non-linear extension function in the direction of the time axis along the advantages that the sixth speech adaptation device commonly has.

A seventh speech adaptation device according to the present invention is characterized in that the vocabulary independent reference patterns in any one of the first, the second, the third, the fourth, and the fifth speech adaptation devices are formed by using the acoustic unit of the reference pattern for speech recognition and word spotting.

For example, description is made with reference to the example in FIG. 4. The reference pattern for the word spotting or the speech recognition has an acoustic unit based on a syllable. For example, in order to determine the vocabulary, /toukyou/, for the speech recognition or the word spotting, the acoustic units are joined to form the reference pattern as /to/, /u/, /kyo/, /u/. On the other hand, the vocabulary independent reference pattern uses the acoustic unit of these syllables as such alone, and, it is possible to form such that the utterance of any and all contents in a language can be received when it is formed to allow reception of transitions between all syllables as in FIG. 4.

Figure 5:
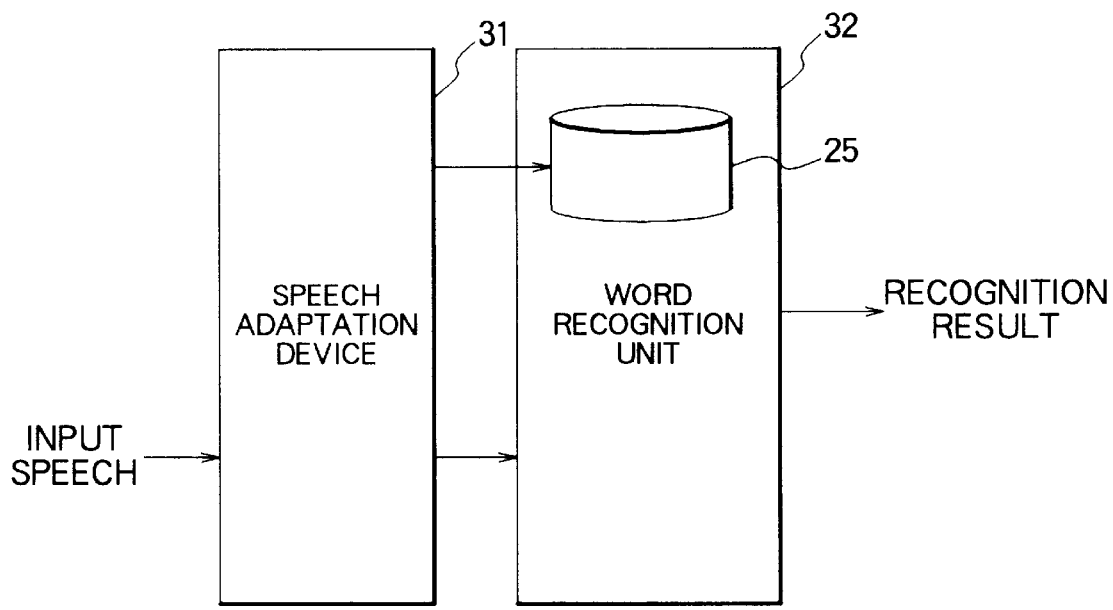
FIG. 5 is a block diagram showing a word speech recognition device according to the present invention.

FIG. 5 is a block diagram of a word speech recognition device according to the present invention. The word recognition device comprises the seventh speech adaptation device depicted at 81 and mentioned above and a word recognition unit 32 for carrying out word recognition by using the adaptation results obtained from the seventh speech adaptation device. The word recognition unit 32 comprises the adapted reference pattern memory 25 described in conjunction with FIG. 2.

The adapted input speech and the adapted reference pattern adapted in the speech adaptation device 31 are subjected to word recognition in the word recognition unit 32. With this structure, the speech adaptation device 31 does not suffer from performance reduction after the adaptation even when the adaptation is carried out with an utterance not present in the vocabulary for the word recognition because it does not depend on the vocabulary of the word recognition unit 32. Conventionally, for example, in a case where the adaptation is carried out also by using a speech received previously, the speech recognition performance may be deteriorated after the adaptation with a speech that is not the one to be recognized previously. The adaptation is carried out at a high performance even in such a case, so that it is possible to provide a word speech recognition device having a stable adaptation mechanism which is independent of the vocabulary. In addition, for example, some speech recognition devices have such a function that is called a so-called rejection to reject speech inputs other than those in the vocabulary. In such an event, the reject can be achieved at a high performance by using the speech adaptation device of the present invention that is not dependent on the vocabulary.

Figure 6:
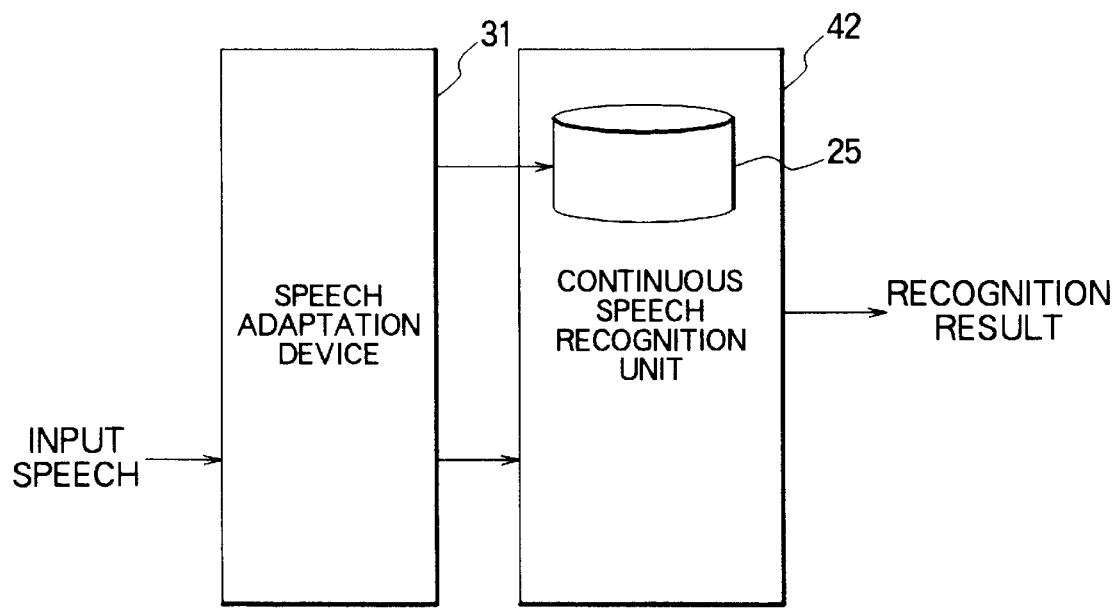
FIG. 6 is a block diagram showing a continuous speech recognition device according to the present invention.

FIG. 6 is a block diagram of a continuous speech recognition device according to the present invention. The continuous speech recognition device comprises the seventh speech adaptation device 31 mentioned above and a continuous speech recognition unit 42 for carrying out continuous speech recognition by using the adaptation results obtained from the seventh speech adaptation device 31.

The adapted input speech and the adapted reference pattern adapted in the speech adaptation device 31 are subjected to continuous speech recognition in the continuous speech recognition unit 42. Typically, a large volume of calculation is required for the continuous speech recognition. Conventional speech adaptation devices use a word reference pattern, so that a large volume of calculation and memory capacity are required for the preliminary matching using this word reference pattern with the structure capable of receiving a continuous speech by using the word reference pattern. On the other hand, the speech adaptation unit 31 does not depend on the vocabulary of the continuous speech recognition unit 42 and carries out adaptation with the less calculation amount. In addition, many non-predictable language phenomena are generated typically in a continuous speech, faltering, repetition, and unnecessary words. The conventional speech adaptation devices using the word reference pattern cannot deal with these utterances. Here, a device having a high recognition performance can be provided by using the speech adaptation device of high performance which is not dependent on the vocabulary.

Figure 7:
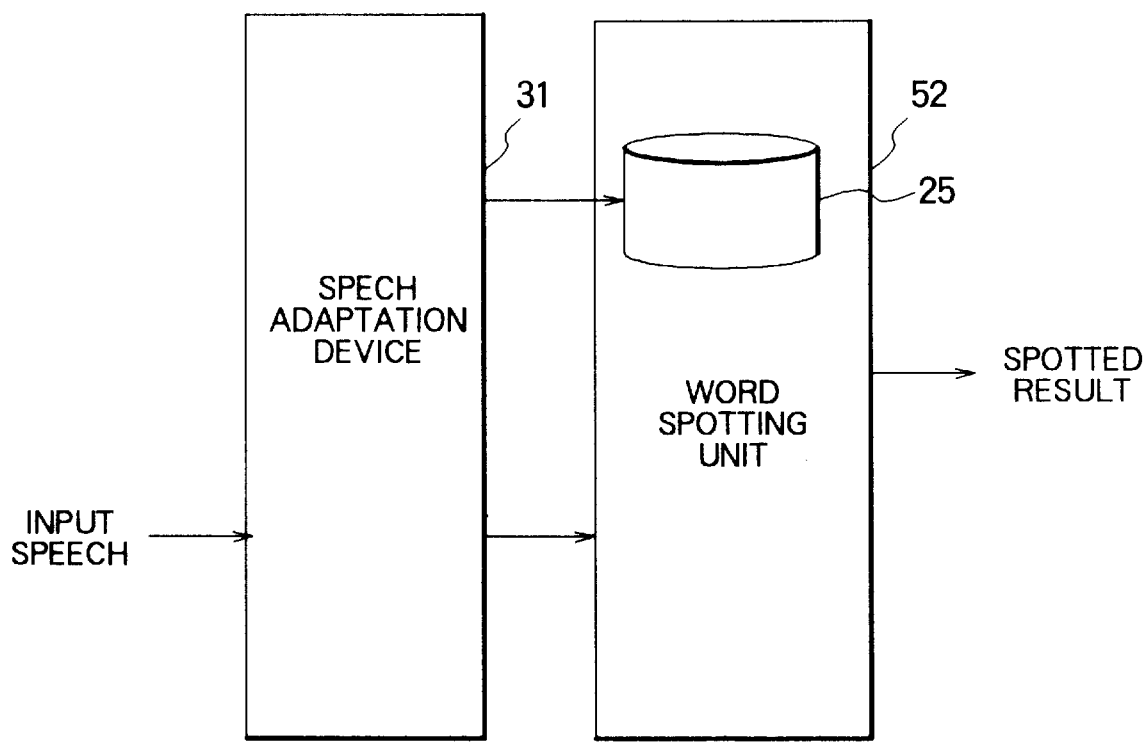
FIG. 7 is a block diagram showing a word spotting device according to the present invention.

FIG. 7 is a block diagram of a word spotting device according to the present invention. The word spotting device comprises the seventh speech adaptation device 31 mentioned above and a word spotting unit 52 for carrying out word spotting by using the adaptation results obtained from the seventh speech adaptation device 31.

The adapted input speech and the adapted reference pattern adapted in the seventh speech adaptation device 31 are subjected to word spotting in the word spotting unit 52. Typically, the input speeches are all unknown in the word spotting in which decision is made whether a predetermined word is present out of continuous conversation. Accordingly, it is impossible to prepare previously word reference patterns because the vocabulary is unknown in the conventional speech adaptation device using the word reference pattern, and it is thus impossible to provide such a device. However, the seventh speech adaptation device 31 allows at the first time to provide a sophisticated word spotting device where an unknown vocabulary is negligible, by using the speech adaptation device 31.

As apparent from the above, according to the first speech adaptation device according to the present invention, there in an effect that stable adaptation can be realized for any speeches because it is not dependent on the vocabulary of the input speech.

According to the second and the third speech adaptation devices of the present invention, such an effect is provided that allows to provide a sophisticated speech adaptation device which does not depend on the vocabulary of the input speech, along with the effect provided in the speech adaptation device of the type described.

According to the fourth and the fifth speech adaptation devices of the present invention, there is an effect that the more sophisticated speech adaptation device can be provided because it is possible to limit transition which is impossible for the subjected language, along with to provide the sophisticated speech adaptation device which does not depend on the vocabulary of the input speech.

According to the sixth speech adaptation device of the present invention, there is an effect that the speech adaptation device of the type described can be provided readily without carrying out segmentation previously even in the case where previous separation for formation into the smaller reference units such as syllables, along with to provide the sophisticated speech adaptation device which does not depend on the vocabulary of the input speech.

When the sixth speech adaptation device is formed by using each centroid obtained after the vector quantization or the HMM distribution, there are effects that the acoustic unit can be realized with a more simple matching technique because it has no non-linear extension function along the time axis, and in turn an inexpensive device can be provided, along with the effects of the sixth speech adaptation device of the present invention.

According to the seventh speech adaptation device of the prevent invention, there in an effect that the adaptation result is utilized directly on the word spotting or the speech recognition by using the acoustic unit commonly for the reference pattern for the word spotting or the speech recognition, allowing to provide a more sophisticated device.

According to the word speech recognition device of the present invention, there is an effect that the word speech recognition device can be provided that has the stable adaptation function independent of the vocabulary. In addition, for the word speech recognition device having a rejection function, the performance does not deteriorate after the adaptation with a word to be rejected because the adaptation does not depend on the vocabulary, realizing the more sophisticated rejection.

According to the continuous speech recognition device of the present invention, the amount calculation and the memory capacity are reduced significantly, so that it is possible to provide the inexpensive device. In addition, there is an effect that a stable and sophisticated continuous speech recognition device can be provided even when a non-predictable linguistic phenomenon occurs such as faltering, repetition, and unnecessary words because it uses the speech adaptation device of high performance which is independent of the vocabulary.

According to the word spotting device of the present invention, there is an effect that it becomes possible for the first time by using the speech adaptation device independent of the vocabulary, which cannot be formed conventionally using the adaptation device of the type described.

What is claimed is:

1. A speech adaptation device comprising:
   an analysis unit for use in converting an input speech into a time series of feature vectors;
   a vocabulary independent reference pattern memory for memorizing a plurality of vocabulary independent reference patterns having one or more categories, each category having one or more acoustic units, and having such a connection relation of the acoustic units that allows reception of any sequence of the acoustic units appearing in said input speech;

a preliminary matching unit connected to said analysis unit and said vocabulary independent reference pattern memory for use in making time-alignment between the time series of the feature vectors of said input speech obtained from said analysis unit and said vocabulary independent reference pattern to obtain mean vectors for individual categories of the input speech and the vocabulary independent reference pattern from the aligned portion for the individual categories of the feature vectors of said input speech and said vocabulary independent reference pattern; and an adaptation unit for use in making correction of at least one of the time series of the feature vectors of said input speech and said vocabulary independent reference pattern by using the mean vectors for each category calculated by said preliminary matching unit, wherein the category of said vocabulary independent reference pattern comprises one or more noise categories and one or more speech categories, said adaptation unit replacing a noise portion of either one of the time series of the feature vectors of said input speech or said vocabulary independent reference pattern with a mean vector Ni of the noise portion of the other, subtracting a mean vector Nt of the noise portion of either one from a speech portion of the same, then multiplying it by (Si−Ni)/(St−Nt), (where a slash / indicates division for each channel of the vectors, Si indicates a mean vector of the speech portion of the other, and St indicates a mean vector of the speech portion of the same), and further adding Ni thereto.

2. A speech adaptation device as claimed in claim 2, wherein the acoustic unit of said vocabulary independent reference pattern is based on a consonant (C), a vowel (V) and a noise (N) appearing in said input speech, or based on a sequence of two or more of these (such as CV, VC, CVC, VN).

3. A speech adaptation device as claimed in claim 1, wherein the acoustic unit of said vocabulary independent reference pattern is one of a state of HMM, each centroid obtained after the vector quantization, and distribution of HMM.

4. A speech adaptation device as claimed in claim 1, wherein said vocabulary independent reference pattern is formed by using an acoustic unit of the reference pattern for recognition or for word spotting.

5. A speech adaptation device comprising:

an analysis unit for use in converting an input speech into a time series of feature vectors;

a vocabulary independent reference pattern memory for memorizing a plurality of vocabulary independent reference patterns having one or more categories, each category having one or more acoustic units, and having such a connection relation of the acoustic units that allows reception of any sequence of the acoustic units appearing in said input speech;

a preliminary matching unit connected to said analysis unit and said vocabulary independent reference pattern memory for use in making time-alignment between the time series of the feature vectors of said input speech obtained from said analysis unit and said vocabulary independent reference pattern to obtain mean vectors for individual categories of the input speech and the vocabulary independent reference pattern from the aligned portion for the individual categories of the feature vectors of said input speech and said vocabulary independent reference pattern; and an adaptation unit for use in making correction of at least one of the time series of the feature vectors of said input speech and said vocabulary independent reference pattern by using the mean vectors for each category calculated by said preliminary matching unit, wherein the acoustic unit of said vocabulary independent reference pattern is based on a consonant (C), a vowel (V) and a noise (N) appearing in said input speech, or based on a sequence of two or more of these (such as CV, VC, CVC, VN).

6. A speech adaptation device as claimed in claim 5, wherein the acoustic unit of said vocabulary independent reference pattern is formed by using one of HMM (Hidden Markov Model), a part of a time series feature vectors of a training speech, and each centroid obtained after vector quantization.

7. A speech adaptation device as claimed in claim 6, wherein said vocabulary independent reference pattern is formed by using an acoustic unit of the reference pattern for recognition or for word spotting.

8. A speech adaptation device as claimed in claim 5, wherein said vocabulary independent reference pattern is formed by using an acoustic unit of the reference pattern for recognition or for word spotting.

9. A speech adaptation device comprising:

an analysis unit for use in converting an input speech into a time series of feature vectors;

a vocabulary independent reference pattern memory for memorizing a plurality of vocabulary independent reference patterns having one or more categories, each category having one or more acoustic units, and having such a connection relation of the acoustic units that allows reception of any sequence of the acoustic units appearing in said input speech;

a preliminary matching unit connected to said analysis unit and said vocabulary independent reference pattern memory for use in making time-alignment between the time series of the feature vectors of said input speech obtained from said analysis unit and said vocabulary independent reference pattern to obtain mean vectors for individual categories of the input speech and the vocabulary independent reference pattern from the aligned portion for the individual categories of the feature vectors of said input speech and said vocabulary independent reference pattern; and an adaptation unit for use in making correction of at least one of the time series of the feature vectors of said input speech and said vocabulary independent reference pattern by using the mean vectors for each category calculated by said preliminary matching unit, wherein said adaptation unit carries out correction for at least one of the time series of the feature vectors of said input speech and said vocabulary independent reference pattern by using a difference between the means vectors of each category, and wherein the acoustic unit of said vocabulary independent reference pattern is based on a consonant (C), a vowel (V) and a noise (N) appearing in said input speech, or based on a sequence of two or more of these (such as CV, VC, CVC, VN).

* * * * *